US 6,580,566 B1

(12) United States Patent　　(10) Patent No.:　US 6,580,566 B1
Kamoda　　(45) Date of Patent:　Jun. 17, 2003

(54) ZOOM LENS AND ZOOM LENS BARREL

(75) Inventor: Masaaki Kamoda, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 10/023,859

(22) Filed: Dec. 21, 2001

(51) Int. Cl.$^7$ .............................................. G02B 15/14
(52) U.S. Cl. ..................... 359/701; 359/700; 359/704
(58) Field of Search ................................ 359/699, 700, 359/701, 704

(56) References Cited

U.S. PATENT DOCUMENTS

| | | | | |
|---|---|---|---|---|
| 4,707,083 A | * | 11/1987 | Iizuka et al. ................. | 359/700 |
| 5,376,983 A | * | 12/1994 | Yamazaki et al. ........... | 359/825 |
| 5,666,565 A | * | 9/1997 | Wakabayashi et al. ...... | 359/699 |
| 5,668,670 A | * | 9/1997 | Nakayama et al. ......... | 359/694 |
| 5,805,353 A | * | 9/1998 | Ichino et al. ................. | 359/699 |
| 5,907,439 A | * | 5/1999 | Matsui ........................ | 352/139 |
| 6,373,641 B2 | * | 4/2002 | Koiwai ....................... | 359/694 |

* cited by examiner

*Primary Examiner*—Ricky Mack
(74) *Attorney, Agent, or Firm*—Jacobson Holman PLLC

(57) ABSTRACT

A zoom lens and zoom lens barrel superior in precision and excellent in manipulability is disclosed, and they have a feature of combination of plastic cam barrel that retains a high dimensional precision and brings about decrease in a manufacturing cost, with the reduced number of components associated with cam follower pins. The zoom lens is comprised of a plurality of groups of lenses, an adjusting ring rotated for zooming by a user, a cam barrel provided with cam grooves and capable of rotating due to turns of the adjusting ring, a linearly moving barrel provided with grooves for linear movement and unable to rotate, n frames for holding n of the groups of lenses (n is an integer), and cam follower pins fitted in the cam grooves and the grooves for linear movement and fixed the first to the n-th frames for correspondingly holding the first to the n-th groups of lenses, respectively. The cam barrel is molded of plastic and has the cam grooves defined in cross-sectional shapes widening toward the outer circumference, and the cam follower pins are elastically formed so as to be fitted in the cam grooves.

4 Claims, 3 Drawing Sheets

ZOOM LENS AND ZOOM LENS BARREL

FIELD OF THE INVENTION

The present invention relates to a zoom lens and zoom lens barrel and more particularly, it relates to a zoom lens and zoom lens barrel that have an improved feature of follower pins for the zoom lens configured correlative to resin barrel with cam mechanism.

BACKGROUND ART

A zoom lens barrel is, in general, of a tiered configuration that includes mutually telescopic barrel components of an adjusting ring rotatably manipulated for zooming by a user, a cam barrel provided with cam grooves and capable of rotating, a linearly moving barrel provided with grooves for linear movement and unable to rotate in itself, and n frames holding n groups of lenses (n is an integer), which are arranged in such an order from the outermost to the innermost. The n-th frame holding the n-th group of lens, for example, is fixedly fitted on a cam follower pin, which is, in turn, fitted in the groove for linear movement and the cam groove. Rotation of the adjusting ring is transmitted to coupling members so as to circumferentially rotate the cam barrel As the adjusting ring is rotated to cause rotation of the cam barrel, the cam follower pin moves in a segment where the cam groove is registered with the groove for linear movement, which brings about desired movement of the n-th group of lenses along on the optical axis.

As to the above-mentioned zoom lens barrel, fabricating the cam barrel of metal results in considerable increase in a manufacturing cost. Specifically, it is necessary that the cam barrel has associated lens frames stably move along in its respectively corresponding cam grooves so as to retain optical performance of the zoom lens, and therefore, the cam grooves must satisfy a dimensional precision within a tolerance of 0.01 mm. Die casting alone results in products of unsatisfied precision inferior to the above-identified tolerance level, and refinement of the fabrication process in combination with a precision grinding procedure is required although this causes significant increase in the manufacturing cost.

If the cam barrel for the zoom lens is made of some type of plastic by metal-die injection molding to define the cam grooves therein with a high dimensional precision, the cam grooves must be shaped in cross sections widening toward the outer circumference to release the die from molded plastic. In such a situation, the cam follower pins must be correspondingly molded in shapes spreading toward the heads, and moreover, elastic elements such as spring have to be used to make elastic contact of sliding surfaces of the cam follower pins with the cam grooves, so that the cam follower pins can be assuredly fitted in the cam grooves and be smoothly slid therein. This design yields adverse effects of increase in the number of components including the elastic element such as the spring and associated elements and increase in the number of process steps in assembling the components, and besides, the additional components such as the spring associated with the cam follower pins resultantly are the cause of increase in dimensions.

The present invention is intended to overcome the above-mentioned disadvantages of the prior art zoom lens barrel, and it is an object of the present invention to provide a zoom lens and zoom lens barrel superior in precision and excellent in manipulability, having a feature of combination of plastic cam barrel that retains a high dimensional precision and brings about decrease in a manufacturing cost, with the reduced number of components associated with cam follower pins.

SUMMARY OF THE INVENTION

In accordance with the present invention, a zoom lens is comprised of a plurality of groups of lenses, an adjusting ring rotated for zooming by a user, a cam barrel provided with cam grooves and capable of rotating due to turns of the adjusting ring, a linearly moving barrel provided with grooves for linear movement and unable to rotate, n frames for holding n of the groups of lenses (n being an integer greater than 1), and cam follower pins fitted in the cam grooves and the grooves for linear movement and fixed to the first to the n-th frames for correspondingly holding the first to the n-th groups of lenses, respectively, in which the cam barrel is molded of plastic and has the cam grooves defined in cross-sectional shapes widening toward the outer circumference, and the cam follower pins are elastically transformed so as to be fitted in the cam grooves.

In another aspect of the present invention, a zoom lens barrel is comprised of an adjusting ring rotated for zooming by a user, a cam barrel provided with cam grooves and capable of rotating due to turns of the adjusting ring, a linearly moving barrel provided with grooves for linear movement and unable to rotate, a lens frames holding lenses, and cam follower pins fitted in the cam grooves and the grooves for linear movement and fixed to the lens frames, in which the cam barrel is molded of plastic and has the cam grooves defined in cross-sectional shapes widening toward the outer circumference, and the cam follower pins are elastically transformed so as to be fitted in the cam grooves.

In this aspect, the cam follower pins have their respective cam groove engagement sections formed in cup-like shapes spreading toward the tops.

BRIEF DESCRIPTION OF THE DRAWINGS

Best modes of the present invention will be detailed below in conjunction with the accompanying drawings in which like reference numerals denote the same components throughout the figures.

DETAILED DESCRIPTION OF THE PREFERRED EMBODIMENTS

Figure 1:
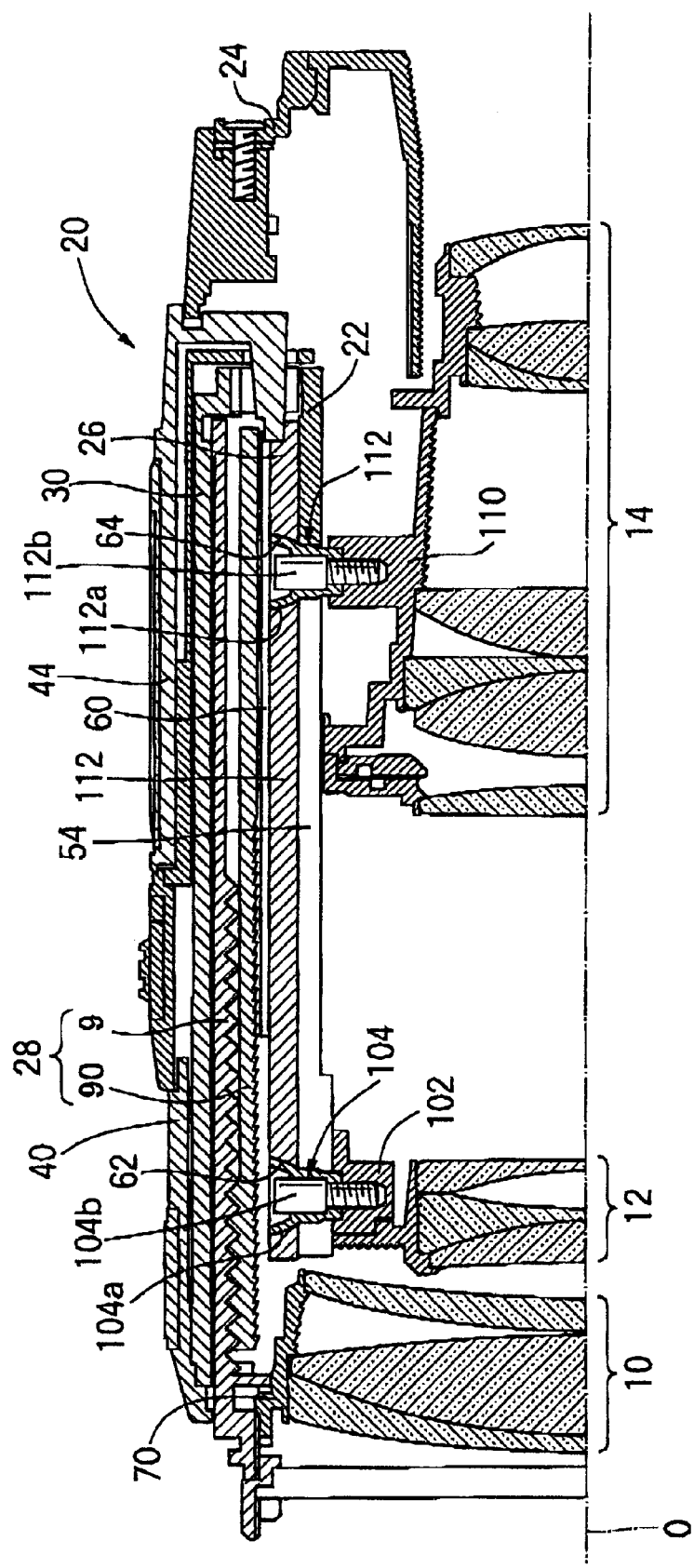
FIG. 1 is a sectional view showing a preferred embodiment of a zoom lens according to the present invention being in wide-mode.
Figure 2:
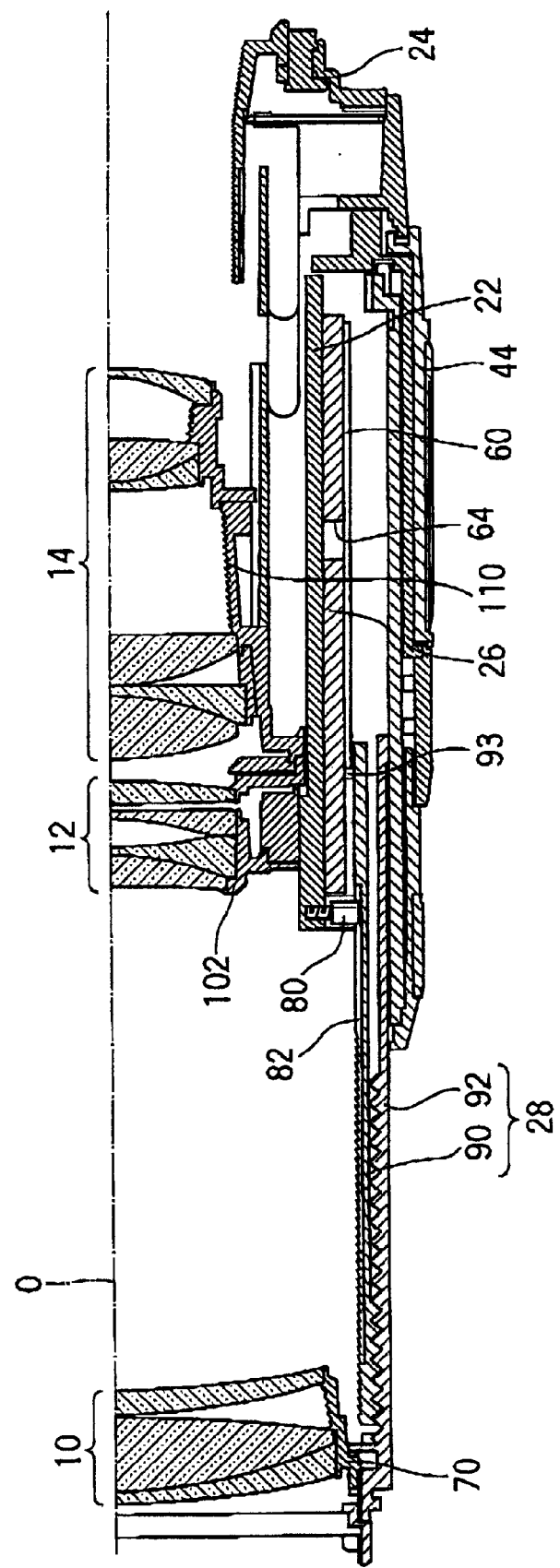
FIG. 2 is a sectional view showing the zoom lens being in tele-mode.
Figure 3:
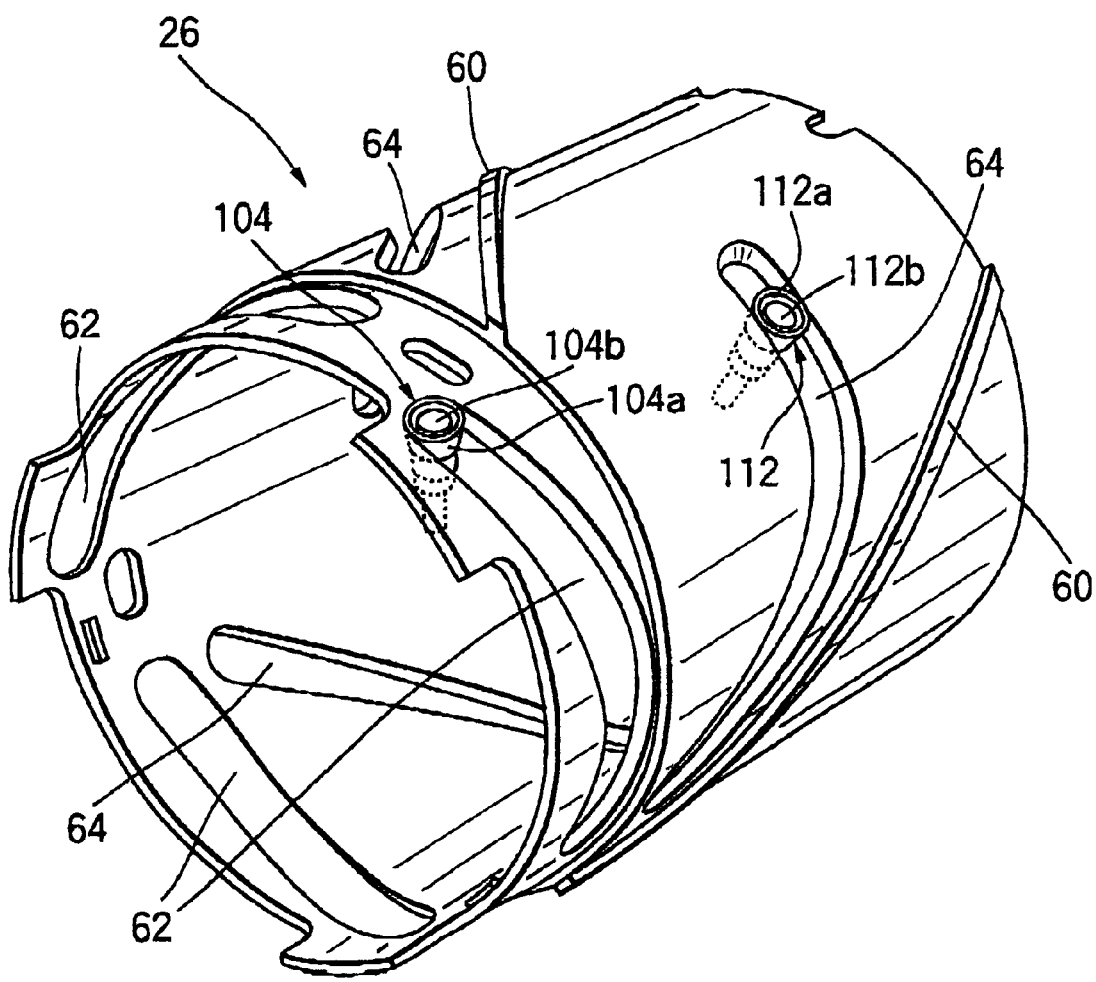
FIG. 3 is an enlarged perspective view showing a preferred embodiment of cam grooves and cam follower pins according to the present invention.

Referring to the accompanying drawings, a preferred embodiment of a zoom lens according to the present invention will now be described in detail. FIG. 1 is a sectional view showing the zoom lens being in wide-mode while FIG. 2 is a sectional view showing the zoom lens being in telemode. FIG. 3 is a perspective view showing a preferred embodiment of cam follower pins according to the present invention.

Optical system consists of a first group 10 of lenses having a positive power attribute and moving along on an optical axis O for focusing, a second group 12 of lenses having a negative power attribute, and a third group 14 of lenses having a positive power attribute.

A zoom lens barrel 20 has a plurality of roughly cylindrical members which are mutually telescopic, including a first fixed barrel 22 fixed to a mount 24 and guiding the second group 12 of lenses and the third group 14 of lenses in parallel with the optical axis O, a cam barrel 26 sliding over the outer surface of the first fixed barrel 22, a barrel 28 in relation with the first group of lenses and sliding over the outer surface of the first fixed barrel 22, a second fixed barrel 30 fixed to the mount 24, a focus adjusting ring 40 rotating and simultaneously sliding over the outer surface of the second fixed barrel 30, and a zoom adjusting ring 44 rotating and simultaneously sliding over the outer surface of the second fixed barrel 30 behind the focus adjusting ring 40, namely, proximal to the mount 24. The zoom adjusting ring 44 is coupled to the cam barrel 26 in proximal position to be a unit and pivot together about the optical axis O.

In the first fixed barrel 22, there is defined second and third grooves 54 shared for linear movement by both the second and third groups 12 and 14 of lenses, and the barrel also has its front end embedded with a first stud 80 for linear movement. The first stud 80 is fitted in a first groove 82 defined in the inner surface of the barrel 28 for linear movement. The cam barrel 26 of synthetic resin, as illustrated in FIGS. 1 and 3, includes raised cams 60 in relation with the first group of lenses and parallelepiped in shape and rectangular in cross-section, second cam grooves 62 in relation with the second group of lenses and widened toward the outer circumference, and third cam grooves 64 in relation with the third group of lenses and widened toward the outer circumference. The first fixed barrel 22 includes linear grooves 54 in relation with the second and third groups of lenses and constant in width from their inner edges toward outer edges.

As can be seen in FIG. 3, a second group 104 of the cam follower pins in relation with the grooves 62 and the second group of lenses, and a third group 112 of the cam follower pins in relation with the grooves 64 and the third group of lenses have their respective upper portions 104a and 112a shaped in truncated cones with their respective narrower tops down, namely, shaped like cups outwardly spreading toward the tops, so as to be fitted in the grooves 62 and the cam grooves 64, respectively. Those upper portions 104a and 112a of the second and third groups 104 and 112 of the cam follower pins are hollow, having conical clearances, so that the upper portions 104a and 112a, being of an elastic material, are elastically transformed and fitted in the grooves 62 and 64. The second and third groups 104 and 112 of the cam follower pins have their respective threaded portions 104b and 112b screwed down and fixed to frames 102 and 110 holding the second and third groups of lenses, respectively.

The barrel 28 in relation with the first group of lenses, which supports a frame 70 holding the first group 10 of lenses, includes a helicoid inner barrel 90 and a helicoid outer barrel 92 which is screwed over and mated with the inner barrel and fixedly supports the frame 70 holding the first group of leases. In the helicoid inner barrel 90, as shown in FIG. 2, the first groove 82 is defined for linear movement of the first stud 80 fitted therein, beyond and ahead of the cam barrel 26 fixed to the first fixed barrel 22. The helicoid outer barrel 92 has its hind portion coupled to the focus adjusting ring 40 by a rotating member (not shown) so as to slide along the optical axis O relative to the second fixed barrel 30, and the barrel is also engaged with the ring to receive rotational movement the same.

The barrel 28 in relation with the first group of lenses has its helicoid inner barrel 90 provided with cam followers 93 that are engaged with the raised cams 60 in relation with the first group of lenses. The frame 102 holding the second group 12 of lenses is fixed with the second group 104 of the cam follower pins partially shaped in upside-down truncated cones, which slide in the cam grooves 62 in relation with the second group of lenses and in the linear grooves 54 for linear movement of the second and third groups of lenses. The frame 110 holding the third group 14 of lenses is fixed with the third group 112 of the cam follower pins partially shaped in upside-down truncated cone, which slide in the cam grooves 64 in relation with the third group of lenses and in the grooves 54.

An operation of the zoom lens having the aforementioned configuration will now be described. In zooming, the zoom adjusting ring 44 is turned to rotate the cam barrel 26 over the first fixed barrel 22. As the cam barrel 26 rotates, the barrel 28 in relation with the First group of lenses, which is restricted in its rotational movement due to the engagement of the first stud 80 with the first groove 82, moves around the optical axis O, following a trajectory determined by the cam mechanism, by virtue of the engagement of the raised cams 60 with the cam followers 93. The frame 102 holding the second group of lenses, which is restricted in its rotational movement due to the engagement of the second group 104 of the cam follower pins with the grooves 54 for linear movement of the second and third groups of lenses, moves around the optical axis O, following a trajectory determined by the cam mechanism, by virtue of the engagement of the second group 104 of the cam follower pins with the cam grooves 62. In addition to that, the frame 110 holding the third group of lenses, which is restricted in its rotational movement due to the engagement of the third group 112 of the cam follower pins with the grooves 54 for linear movement of the second and third groups of lenses, moves around the optical axis O, following a trajectory determined by the cam mechanism, by virtue of the engagement of the third group of the cam follower pins 112 with the cam grooves 64 in relation with the third group of lenses. In this way, the zooming is performed In focusing, the focus adjusting ring 40 is turned to make the rotation member (not shown) transmit the rotation to revolve the helicoid outer barrel 92. Meanwhile, the helicoid inner barrel 90 is restricted in its rotational movement due to the first stud 80 fixed to the first fixed barrel 22 and the first groove 82 for linear movement, and instead, the helicoid outer barrel 92 holding the frame 70 in relation with the first group of lenses, while screwing on and off the helicoid inner barrel 90, moves around the optical axis O along a trajectory determined by the cam mechanism. In this way, the focusing is attained.

Thus, in accordance with the present invention, a zoom lens and zoom lens barrel is superior in precision and excellent in manipulability because of the combination of a plastic cam barrel that retains a high dimensional precision and brings about a decrease in the manufacturing cost, with the reduced number of components associated with the cam follower pins which, being elastic themselves, eliminate the need for additional elastic elements.

These objects, advantages, and features of the present invention have been given only by way of examples but not for limitations, and therefore, it should be noted that a person having ordinary skills in the art would appreciate that there should be a variety of variations and modifications of the best modes as described above, without departing the true spirit and scope of the present invention as defined in the appended claim.

What is claimed is:

1. A zoom lens comprising:

a plurality of groups of lenses, an adjusting ring rotated for zooming by a user, a cam barrel provided with cam grooves and capable of rotating due to turns of the adjusting ring, a linearly moving barrel provided with grooves for linear movement and unable to rotate, n frames for holding n of the groups of lenses, where n is an integer greater than 1, and elastic cam follower pins fitted in the cam grooves and the grooves for linear movement and fixed to the first to the n-th frames for correspondingly holding the first to the n-th groups of lenses, respectively, the cam barrel being molded of plastic and having the cam grooves defined in cross-sectional shapes which widen toward the outer circumference, and the cam follower pins being elastically transformed so as to be fitted in the cam grooves.

2. The zoom lens according to claim 1, wherein the cam follower pins have their respective cam groove engagement sections formed in cup-like shapes spreading toward the tops.

3. A zoom lens barrel comprising:

an adjusting ring rotated for zooming by a user, a cam barrel provided with cam grooves and capable of rotating due to turns of the adjusting ring, a linearly moving barrel provided with grooves for linear movement and unable to rotate, lens frames holding lenses, and elastic cam follower pins fitted in the cam grooves and the grooves for linear movement and fixed to the lens frames, the cam barrel being molded of plastic and having the cam grooves defined in cross-sectional shapes which widen toward the outer circumference, and the cam follower pins being elastically transformed so as to be fitted in the cam grooves.

4. The zoom lens barrel according to claim 3, wherein the cam follower pins have their respective cam groove engagement sections formed in cup-like shapes spreading toward the tops.

* * * * *